United States Patent [19]

Aritomi

[11] 4,111,871

[45] Sep. 5, 1978

[54] OIL-MODIFIED ALKYD RESIN COMPOSITION

[75] Inventor: Mitsutoshi Aritomi, Ibaraki, Japan

[73] Assignee: Mitsubishi Petrochemical Company Limited, Japan

[21] Appl. No.: 787,962

[22] Filed: Apr. 15, 1977

[30] Foreign Application Priority Data

Apr. 19, 1976 [JP] Japan ................................. 51-44317
Dec. 2, 1976 [JP] Japan ................................. 51-143961

[51] Int. Cl.$^2$ .......................... C09D 3/64; C09D 3/66
[52] U.S. Cl. ............................. 260/22 CB; 260/23 P
[58] Field of Search ................. 260/22 CB, 873, 23 P

[56] References Cited

U.S. PATENT DOCUMENTS

| | | | |
|---|---|---|---|
| 3,620,989 | 11/1971 | Cummings | 260/22 CB |
| 3,770,675 | 11/1973 | Taft | 260/22 CB |
| 3,882,006 | 5/1975 | Watanabe et al. | 260/22 CB |
| 3,882,007 | 5/1975 | Watanabe et al. | 260/22 CB |
| 3,992,276 | 11/1976 | Powanda et al. | 260/873 |
| 4,010,126 | 3/1977 | Kuzma | 260/22 CB |
| 4,025,471 | 5/1977 | Takahashi | 260/22 CB |

FOREIGN PATENT DOCUMENTS

| | | | |
|---|---|---|---|
| 702,675 | 1/1954 | United Kingdom | 260/22 CB |
| 841,700 | 7/1960 | United Kingdom | 260/22 CB |
| 862,583 | 3/1961 | United Kingdom | 260/22 CB |

*Primary Examiner*—Ronald W. Griffin
*Attorney, Agent, or Firm*—Robert E. Burns; Emmanuel J. Lobato; Bruce L. Adams

[57] ABSTRACT

Oil-modified alkyd resin composition comprising:

(A) 50 to 80% by weight of an oil-modified alkyd resin which is modified with a fatty acid containing at least 65% by weight of linoleic acid and/or linolenic acid and has an oil length of 40 to 70%; and (B) 50 to 20% by weight of an acrylate and/or methacrylate which is a monoester of an alcohol having from 2 to 20 carbon atoms and acrylic acid or methacrylic acid.

15 Claims, No Drawings

OIL-MODIFIED ALKYD RESIN COMPOSITION

BACKGROUND OF THE INVENTION

Field of the Invention

The present invention relates to a solventless type hardenable or curable resin composition. More particularly, the present invention is concerned with an oil modified alkyd resin composition which can be dried at room temperature and hardened by baking and is capable of providing a film having excellent surface smoothness, hardness, and adhesiveness to metals and woods.

Oil-modified alkyd resins are, in general, prepared from polybasic acids, polyhydric alcohols, and unsaturated fatty acids. Because the double bond in the unsaturated fatty acids of the resin constituents tends to take part in a cross-linking reaction in the presence of oxygen in air thereby to harden the resins, they have been used in various paints such as room temperature drying paints and baking paints.

Considering that the fatty acid in the oil-modified alkyd resin reacts with glycerin to form a triglyceride, the weight percentage of the formed triglyceride present in the resin is called an oil length. The oil length is an important indication of the physical properties of a paint. That is, the solubility, hardness, gloss, color preserving ability, weather resistance, hardening time, and storage life of a paint are estimated on the basis of the oil length. For example, an increase in oil length has the effect of enhancing the flexibility and solubility in organic solvents of a paint film, while it tends to decrease the hardness of the film. On the other hand, a reduction in oil length results in an enhancement of the gloss and color preserving ability of the film, while it tends to decrease the extensibility of a paint. It is to be understood, of course, that the oil length is not the only factor influencing the physical properties of the paint, and that these properties depend also upon the nature of the other constituents of the oil-modified alkyd resin.

Conventional oil-modified alkyd resins have an oil length of the order of 30 to 80% and are generally dissolved in a solvent such as turpentine oil and toluene to be used as a room temperature drying paint or baking paint. However, an oil-modified alkyd resin paint of this character diluted with a solvent requires a long drying time, and, moreover, the solvent vaporized during drying pollutes the working environment.

Alkyd resin paints using no solvent, i.e., those of the solventless type (also called non-pollution type) paints wherein all the paint constituents contained in the paints react have been proposed. These paints have not only poor adhesion to metals but also poor mechanical properties such as impact resistance and flexure resistance. Furthermore, their spreadability is inferior. Accordingly, these paints have not yet been put to practical use.

SUMMARY OF THE INVENTION

It is an object of the present invention to provide solvent-less paints which can be dried at room temperature and hardened by baking and are capable of providing films having excellent surface smoothness, hardness, and adhesiveness to metals and woods.

It is another object of the present invention to provide paints of the above mentioned type wherein the initial film formed during drying at room temperature has excellent water resistance.

The other objects of the present invention will be apparent from the following description and the accompanying claims.

In accordance with one embodiment (embodiment I) of the present invention, there is provided an oil-modified alkyd resin composition comprising:

(A) 50 to 80% by weight of an oil-modified alkyd resin which is modified with a fatty acid containing at least 65% by weight of linoleic acid and/or linolenic acid and has an oil length of 40 to 70%, preferably 40 to 60%; and (B) 50 to 20% by weight of an acrylate and/or methacrylate which is a monoester of an alcohol having from 2 to 20 carbon atoms and, preferably, at least two hydroxyl groups and acrylic acid or methacrylic acid.

The oil-modified alkyd resin composition according to the embodiment I can be dried at room temperature and hardened by baking and is capable of providing a film of excellent surface smoothness, hardness, and adhesiveness to metals and woods.

In accordance with another embodiment (embodiment II) of the present invention, there is provided an oil-modified alkyd resin composition comprising the following components (A), (B), and (C), the sum of the components (B) and (C) being 50 to 20% by weight.

(A) 50 to 80% by weight of an oil-modified alkyd resin which is modified with a fatty acid containing at least 65% by weight of linoleic acid and/or linolenic acid and has an oil length of 40 to 70%;

(B) 0 to 45% by weight of an acrylate and/or methacrylate which is a monoester of an alcohol having from 2 to 20 carbon atoms and acrylic acid or methacrylic acid;

(C) 0 to 30% by weight of an acrylate and/or methacrylate which is a di-, tri- or tetra-ester of an alcohol having from 2 to 20 carbon atoms, at least two hydroxyl groups, and acrylic acid or methacrylic acid.

The oil-modified alkyd resin composition according to this embodiment when dried at room temperature produces an initial film of excellent water resistance and provides a final film of excellent chemical resistance and flexure resistance.

DETAILED DESCRIPTION

1. Oil-modified Alkyd Resin (component (A))

The oil-modified alkyd resin (component (A)) usable for the present invention is essentially any of the conventional oil-modified alkyd resins and oil-modified alkyd resins which may be produced in the future, provided that the modifying fatty acid preferably contains at least 65% by weight of linoleic acid or linolenic acid and has an oil length of 40 to 70%.

Therefore, the polybasic acids suitable for use in the preparation of the alkyd resin are aromatic, aliphatic and alicyclic saturated polybasic acids such as phthalic anhydride, isophthalic acid, tetrahydrophthalic anhydride, adipic acid, sebacic acid, azelaic acid, 1,2,3,6-tetrahydrophthalic anhydride derivatives having a side chain which are obtained from various isoprene dimers containing a conjugated double bond and maleic anhydride by a DielsAlder addition reaction, for example, myrcene-maleic anhydride adduct, allocimene-maleic anhydride adduct, ocimene-maleic anhydride adduct, 3-($\beta$-methyl-2-butenyl)-5-mehtyl-1,2,3,6-tetrahydrophthalic acid, hexahydrophthalic anhydride and trimellitic acid. These polybasic acids may be used alone or in combination.

A part of the above mentioned saturated polybasic acids may be replaced by unsaturated polybasic acid such as maleic acid, maliec anhydride, fumaric acid and itaconic acid. In this case, the unsaturated polybasic acid should be used in a quantity such that it causes no gelation. Among these, a combination of phthalic acid and 3-(β-methyl-2-butenyl)-5-methyl-1,2,3,6-tetrahydrophthalic anhydride (hereinafter referred to as MBTHP for the sake brevity) is a particularly preferred polybasic acid. The use of the MBTHP as a part of the polybasic acid is significantly effective in reducing the viscosity of the alkyd resin.

Examples of the polyhydric alcohol component are ethylene glycol, diethylene glycol, propylene glycol, dipropylene glycol, 1,4-butanediol, neopentyl glycol, glycerine, pentaerythritol, trimethylolpropane, trimethylolethane, and tris(2-hydroxyethyl)isocyanurate. These polyhydric alcohols may be used singly or in combination. In general, dihydric, trihydric and tetrahydric alcohols having from about 2 to 12 carbon atoms are used.

The fats and oils and fatty acids which may be used in the preparation of the oil-modified alkyd resin should be air dryable. Examples of such fats and oils and fatty acids are linseed oil, safflower oil, dehydrated castor oil and fatty acids separated from these oils.

It is desirable that the fat and oil or fatty acid as a modifying agent should contain at least 65% by weight, preferably at least 80% by weight, of linoleic acid and/or linolenic acid, based on the total fatty acid content. Accordingly, the fatty acids which may be used in the present invention are fatty acids separated from drying oils or semi-drying oils such as dehydrated castor oil fatty acid (a linoleic acid content of 76 to 88%), linseed oil fatty acid (a linoleic acid content of 15% and a linolenic acid content of 52%) and safflower oil fatty acid (a linoleic acid content of 72 to 80%) as well as linoleic acid, linolenic acid and a mixture of the both.

The oil-modified alkyd resin may be prepared from the above mentioned three essential components by means of conventional methods. More specifically, for example, a method comprising charging the fatty acid, the polybasic acid and the polyhydric alcohol together and reacting the mixture, or a method comprising reacting first the fatty acid and the polyhydric alcohol to form a monoester and then reacting the monoester with the polybasic acid (and the polyhydric alcohol) may be used for such purpose. The former is preferred for reasons of simplicity of production. These three essential components may be supplied in the form of their functional derivatives such as esters to the reaction system.

The oil-modified alkyd resin usable for the present invention should have an oil length of 40 to 70%, preferably 40 to 60% (Embodiment I). If the oil length is less than 40%, a film formed at the start of room temperature drying is inferior in water proofness. On the other hand, when the oil length exceeds 70%, the viscosity of the resulting resin composition and the hardness of the resultant film are adversely affected.

An oil-modified alkyd resin having an acid value of 5 to 40 is suitable for the embodiments I and II.

The oil-modified alkyd resin may be prepared from these three essential components by means of conventional methods. More specifically, for example, a method comprising charging the fatty acid, the polybasic acid, and the polyhydric alcohol together and reacting the mixture is used. These three essential components may be supplied in the form of their functional derivatives such as esters, i.e. fat and oil itself, to the reaction system. In the case where the fat and oil are used, it is the usual practice to react preliminarily the polyhydric alcohol and the ester only thereby to effect an interesterification. Whichever method is used, it is desirable to add a gelation inhibiting agent such as hydroquinone in order to prevent gelation during the reaction process.

3. Polymerizable Monomer (components (B) and (C))

Any monomer having at least one radical-polymerizable ethylenic unsaturated bond and capable of dissolving the required concentration (detailed hereinafter) of the afore-mentioned component (A) may be used. However, since it is contemplated that the resin composition of the present invention be hardenable at room temperature or heat hardenable, polymerizable monomers having a boiling point as high as 200° C, such as acrylates and methacrylates (the component (B) or (C)) having a boiling point of no less than 200° C are particularly preferable.

Mono (meth)acrylate (component (B))

As the monoacrylate or monomethacrylate of the component (B), esters of monohydric or polyhydric alcohols having from 2 to 20 carbon atoms, preferably 2 to 18 carbon atoms, preferably di-, tri- and tetra-hydric alcohols, and acrylic acid or methacrylic acid are used. The alcohol is not necessarily one in which the group to be attached by a hydroxyl group is a hydrocarbon, and it may contain an ether linkage.

Examples of such monoacrylates and monomethacrylates are as follows. These monoacrylates and monomethacrylates may be used alone or in combination. In the following, the term "(meth)acrylate" refers to both acrylate and methacrylate.

2-hydroxyethyl (meth)acrylate, 2-hydroxypropyl (meth)acrylate, 2-hydroxyethoxyethyl (meth)acrylate, 4-hydroxybutyl (meth)acrylate, 5-hydroxypentyl (meth)acrylate, 6-hydroxyhexyl (meth)acrylate, meopentylglycol mono(meth)acrylate, acrylate, 3-butoxy-2-hydroxypropyl (meth)acrylate, 2-hydroxy-1-phenylethyl (meth)acrylate, polypropyleneglycol monomethacrylate, glycerin mono(meth)acrylate monohalfmaleate, diethyleneglycol mono(meth)acrylate, cyclohexyl (meth) acrylate, benzyl (meth)acrylate, 2-ethoxyethyl(meth)acrylate, 2-butoxyethyl (meth)acrylate, and tetrahydrofurfuryl (meth) acrylate.

Among these compounds, 3-butoxy-2-hydroxypropyl (meth)acrylate and 2-hydroxy-1-phenylethyl (meth)acrylate which are a (meth)acrylate having one free hydroxyl group are particularly preferable.

Further, di-, tri- or tetra-acrylic or methacrylic esters (for example, the component (C)) of the polyhydric alcohols may be used in conjunction with the polymerizable monomers of the present invention. Such esters increase the hardness of the resultant film. While they function to reduce the adhesiveness of the film. Accordingly, these esters should be used in accordance with the painting purposes and applications.

When esters of a monoalcohol or monoalkoxyalcohol and acrylic acid or methacrylic acid which are polymerizable monomers having no hydroxyl group are used, the resulting paint may be inferior in adhesion. Further, because these polymerizable monomers generally have a low boiling point, they vaporize and are harmful to the human body or give off an offensive smell, and, thus, they are unfavorable. However, an acrylate or methacrylate having a higher boiling point such as lauryl methacrylate may be used in a small quantity in conjunction with the polymerizable monomer, i.e., the acrylate or methacrylate, of the present invention which is a monoester of the alcohol having at least two hydroxyl groups and from 2 to 20 carbon atoms and acrylic acid or methacrylic acid.

When these (meth)acrylates having a higher boiling point are used in conjunction with the polymerizable monomer of the present invention, vinyl monomers having a lower boiling point, such as styrene, methyl acrylate and divinylbenzene may be used together therewith.

In the embodiment II, the component (B) may be replaced by the component (C) or the component (B) and the component (C) may be used together. Even in the embodiment II, the component (B) preferably is a mono (meth)acrylate of an alcohol having at least two hydroxyl groups.

Di-tetra(meth)acrylate (component (C))

The component (C) which is used in place of the component (B) or in conjunction therewith is di-, tri- or tetra-esters of an alcohol having at least two hydroxyl groups and from 2 to 20 carbon atoms, preferably 2 to 18 carbon atoms, preferably di-, tri- and tetra-hydric alcohols and acrylic acid or methacrylic acid. The alcohol is not necessarily one in which the group to be attached by a hydroxyl group is a hydrocarbon, and it may contain an ether linkage. If the alcohol is trihydric or higher, it may be used provided that at least two hydroxyl groups of the alcohol is esterified with acrylic acid or methacrylic acid.

Examples of such di-, tri- and tetra-acrylates and methacrylates are as follows. These esters may also be used in admixture.

Ethyleneglycol di(meth)acrylate, diethyleneglycol di(meth)acrylate, 1,4-butanediol di(meth)acrylate, 1,6-hexanediol di(meth)acrylate, neopentylglycol di(meth)acrylate, trimethylolpropane tri(meth)acrylate, penthaerythritol tri(meth)acrylate, and penthaerythritol tetra(meth)acrylate. Among these esters 1,4-butanediol di(meth)acrylate is preferable.

The oil-modified alkyd resin composition of the present invention contains the above described essential components with specific ratios.

Specific compositional ranges are somewhat different between the embodiments I and II. The compositional ranges will be described with regard to the respective embodiments I and II hereunder.

EMBODIMENT I

The oil-modified alkyd resin (the component (A)) is used in a quantity of 50 to 80% by weight and the above described polymerizable monomer (the component (B)) is used in a quantity of 50 to 20% by weight.

When the polymerizable monomer is less than 20% by weight, the resultant resin composition is not fully dried and is highly viscous and is thus difficult to apply. On the other hand, in the case where the polymerizable monomer is greater than 50% by weight, the resultant film exhibits a sharp decrease in adhesion and simultaneously a low water proofness.

EMBODIMENT II

The component (A) comprises 50 to 80% by weight, preferably 60 to 70% by weight of the total weight of the three components.

The component (B) comprises 0 to 45% by weight, preferably 20 to 40% by weight of the total weight of the three components. When the component (B) exceeds 45% by weight, the resultant film becomes remarkably inferior in hardness and water proofness.

The component (C) comprises 0 to 30% by weight, preferably 5 to 25% by weight, of the total weight of the three components. When the component (C) exceeds 30% by weight, the resulting oil-modified alkyd resin composition becomes inferior in storage stability and, at the same time, the resultant film tends to become inferior in flexure resistance.

Further, the components (B) and (C) are used in such a manner that the sum of their quantities is 50 to 20% by weight, preferably 40 to 30% by weight, of the total weight of the three components.

When the sum of the quantities of the two components is less than 20% by weight, the resulting oil-modified alkyd resin composition exhibits an unsatisfactory drying property and, simultaneously, a high viscosity and is therefore difficult to apply. On the other hand, in the case where the sum of the quantities of the two components exceeds 50% by weight, the resultant film exhibits a reduction in flexure resistance and, at the same time, tends to have inferior water proofness.

5. Modification

The oil-modified alkyl resin composition of the present invention may be variously modified as long as it comprises the above described essential components in the specified amounts.

Therefore, various additives may be added to the present composition as is the case with conventional resin compositions. For example, fillers, coloring agents, stabilizers, thixotropic agents, film surface modifying agents, pigment dispersing agents, and the like may be suitably added to the present composition depending upon the use thereof (for hardeners or dryers, reference is made to the description set forth hereinafter).

Another measure or method of modifying the oil-modified alkyd resin composition of the present invention is to add a mono- or poly-ethylenic unsaturated monomer which is capable of reacting or copolymerizing with the components (A), (B), and (C) to these components. It is desirable that the monomers be compatible with the components (A), (B), and (C). Also, preferably, the monomers have a high boiling point (particularly, above 200° C.) from the standpoint of prevention of the reduction in solid content by evaporation and prevention of the polution of the working environment.

Examples of such monomers are benzyl acrylate (boiling point 210° C.), n-stearyl acrylate (b.p. 350° C.), carbitol acrylate (b.p. 250° C.). These monomers may be used in combination.

An important characteristic of the oil-modified alkyd resin composition of the present invention is that it is of the solvent-less type. However, this does not mean that the composition cannot be used as a solvent type. Accordingly, it is to be understood that the present composition may be dissolved in a solvent and used if desired.

6. Utilization

The paint composition of the present invention may be hardened in the presence of a redox catalyst comprising organic peroxide, reducing agents, and, as required, metal dryers such as manganese naphthenate and cobalt naphthenate.

Examples of the catalyst are:

(a) A combination of methyl ethyl ketone peroxide and cobalt naphthenate;

(b) A combination of a redox catalyst comprising benzoyl peroxide, dimethylaniline, and cobalt naphthenate or manganese naphthenate; and (c) A combination of cyclohexanone peroxide and cobalt naphthenate.

In particular, cobalt naphthenate is suitable because it takes part in not only the generation of radicals as a reducing agent but also the oxidation hardening of the oil-modified alkyd resin as a metal dryer.

The quantity of hardener or dryer used is left to the choice of the operators. For example, with respect to 100 parts by weight of the oil-modified alkyd resin composition, the organic peroxide is in the range of the order of 0.5 to 5 parts by weight, the reducing agent is in the range of the order of 0.01 to 5 parts by weight, and the dryer is in the range of the order of 0.01 to 5 parts by weight.

One of the utilization embodiments of the oil-modified alkyd resin composition of the present invention is the use of the composition as a solventless type paint.

To the oil-modified alkyd resin composition are usually added pigments or dyes such as titanium oxide, zinc flower, ultramarine and chromium oxide, and, if necessary, film surface property modifying agents such as polyethylene glycol, pigment dispersing agents, stabilizers, and the like may be added to the oil-modified alkyd resin composition to prepare a paint composition.

Such a paint composition can be dried at room temperature and hardened by baking, and can be hardened at elevated temperatures such as a temperature of no less than 100° C. When the paint composition is used as a room temperature drying paint, it is most suitable for painting outdoor structures because the time required to harden the composition is short.

7. Experimental Example

In the following examples and comparative examples, all quantities specified in "parts" are parts by weight.

IA PREPARATION OF OIL-MODIFIED ALKYD RESIN

Preparation Example I-1

50 parts of linoleic acid, 34.8 parts of phthalic anhydride, 21.4 parts of glycerin and 1.2 parts of neopentyl glycol were charged into a reaction vessel equipped with a stirrer, a thermometer, a cooler, a water separator, and an inlet tube for introducing nitrogen. 4 Parts of xylene was then added to the vessel, and the resulting mixture was reacted together in a stream of nitrogen at a temperature of 220° C. until the acid value of the reaction mixture became less than 20. After this, the water and xylene were removed from the reaction product to obtain a yellowish brown linoleic acid modified alkyd resin having an oil length of 52.3% (resin-IA).

Preparation Example I-2

100 Parts of the resin-IA and 200 parts of isopropyl alcohol were charged into a reaction vessel equipped with a stirrer, a thermometer, a cooler, and an inlet tube for introducing nitrogen. The content of the vessel was stirred in a stream of nitrogen at a temperature of 60° C. for 2 hours. After stirring, the vessel was cooled and left to stand. The upper layer of the alcohol was separated to obtain a resin layer from which low molecular weight compounds were removed. The resin layer was subjected to reduced pressure distillation to remove the isopropyl alcohol dissolved therein. Thus, a linoleic acid-modified alkyd resin of a charge quantity of 76% of the resin-IA (resin-IB) was obtained.

Preparation Examples I-3 through I-7

A dehydrated castor oil-modified alkyd resin (resin-IC), a linolenic acid-modified alkyd resin (resin-ID), a linseed oil-modified alkyd resin (resin-IE), a soybean oil-modified alkyd resin (resin-IF), and an oleic acid-modified alkyd resin (resin-IG), each having an oil length of 52.3%, were produced using the same procedures as those described in Example I-1 except that 50 parts of each of dehydrated castor oil fatty acid, linolenic acid, linseed oil fatty acid, soybean oil fatty acid, and oleic acid were used instead of 50 parts of linoleic acid.

The linoleic acid and linolenic acid contents of the respective fatty acids used in the reaction were as follows:

|  | Linoleic Acid | Linolenic Acid |
|---|---|---|
| Dehydrated castor oil fatty acid | 76 – 88% | — |
| Linseed oil fatty acid | 15% | 52% |
| Soybean oil fatty acid | 51% | 8% |

Preparation Example I-8

A linoleic acid modified alkyd resin having an oil length of 36.6% (resin-IH) was prepared by the procedure described in Example I-1 except that 35.0 parts of linoleic acid, 41.6 parts of phthalic anhydride, 12.4 parts of glycerin, and 184 parts of neopentyl glycol were used.

Preparation Example I-9

A linoleic acid modified alkyd resin having an oil length of 41.8% (resin-IJ) was prepared according to the procedure described in Example I-1 except that 40.0 parts of linoleic acid, 40.6 parts of phthalic anhydride, 18.3 parts of glycerin, and 8.7 parts of neopentyl glycol were used.

Preparation Example I-10

A linoleic acid modified alkyd resin having an oil length of 58.5% (resin-IK) was prepared according to the procedure described in Example I-1 except that 56.0 parts of linoleic acid, 30.1 parts of phthalic anhydride, 15.6 parts of glycerin, and 5.6 parts of pentaerythritol were used.

IB Paint Evaluation

Each of the oil-modified alkyd resins A through K was blended with a polymerizable monomer in the ratios indicated in Table 1. Then, 0.5 part of cobalt naphthenate and 1 part of methyl ethyl ketone peroxide were added to 100 parts of each of the resultant mixtures (paint compositions). The resulting paints were respectively applied on a polished mild steel plate measuring 50mm × 150mm and having a thickness of 0.3mm. The quantity of paint applied was such that the thickness of the paint film was 40 μ. The painted steel plate was left to stand in an air bath at a temperature of 30° C. for 7 days. At the end of that period, the properties of the film formed on the steel plate were determined under the following conditions. The results are shown in Table 1.

For reference, the time until the stickiness of the film felt by finger touch disappears (finger touch drying time) is shown in Table 1.

Measurement Methods

Viscosity: Emila Rotary Viscometer (manufactured by Reciprotor A/S, Denmark) was used.

Pencil hardness: The measurement was carried out according to Japanese Industrial Standards, K-5652 method. Evaluation was made on the basis of the occurrence of a scratch.

Adhesion: Cross-cut peeling test, according to Japanese Industrial Standards, K-5400

Flexure resistance: According to Japanese Industrial Standards, K-5400(2mm)

Impact resistance: Dupont Impact Resistance ($\frac{1}{2}$ inch $\times$ 500g $\times$ 50cm)

Hot water resistance: Observation of change after immersion in hot water at 95° C. for 30 minutes (o = no change, x = change)

Table I

| Ex. | Oil-modified alkyl resin | | | Paint Composition (part) | | | | | | Visco-sity (poise 25° C) | Film property | | | | | | Finger touch drying time (hour) |
|---|---|---|---|---|---|---|---|---|---|---|---|---|---|---|---|---|---|
| | Fatty Acid | | Oil length (%) | Oil-modified alkyd resin | Polymerizable* monomer | | | | | Surface smooth-ness | Pencil hard-ness | Adhesion | Flexure resis-tance | Impact resis-tance | Hot water resis-tance | |
| | Quantity of linoleic acid (%) | Quantity of linolenic acid (%) | | | HPA | BHPA | TMP | EEA | | | | | | | | | |
| | Type | | | | | | | | | | | | | | | | |
| | IA | 100 | — | 52.3 | 60 | 20 | 20 | — | — | 5.0 | o | F | 100/100 | o | o | o | 1.5 |
| | IA | 100 | — | 52.3 | 60 | 20 | 20 | — | — | 5.0 | o | H | 100/100 | o | o | o | (1/3)** |
| | IA | 100 | — | 52.3 | 50 | 25 | 25 | — | — | 3.1 | o | B | 100/100 | o | o | o | 2.0 |
| | IA | 100 | — | 52.3 | 80 | 10 | 10 | — | — | 3.5 | o | F – H | 100/100 | o | o | o | 1.0 |
| | IA | 100 | — | 52.3 | 60 | 20 | 20 | — | — | 5.5 | o | H | 100/100 | o | o | o | 1.0 |
| | IB | 100 | — | 52.3 | 60 | 30 | 10 | — | — | 5.5 | o | HB | 100/100 | o | o | o | 1.2 |
| | IC | 80 | — | 52.3 | 60 | 20 | 20 | — | — | 5.0 | o | HB | 100/100 | o | o | o | 1.0 |
| | ID | — | 100 | 52.3 | 60 | 20 | 20 | — | — | 6.0 | o | B | 100/100 | o | o | o | 1.5 |
| | IE | 15 | 52 | 52.3 | 60 | 20 | 20 | — | — | 5.1 | o | B – HB | 100/100 | o | o | o | 1.5 |
| | IJ | 100 | — | 41.8 | 60 | 20 | 20 | — | — | 5.0 | o | HB – F | 100/100 | o | o | o | 1.6 |
| | IK | 100 | — | 58.5 | 60 | 15 | — | 30 | — | 5.0 | o | HB | 0/100 | x | o | o | 1.5 |
| | IA | 100 | — | 52.3 | 60 | 10 | — | — | 25 | 6.2 | o | H | 0/100 | o | o | o | 1.0 |
| | IA | 100 | — | 52.3 | 45.4 | 27.3 | 27.3 | — | — | 1.9 | o | B | 0/100 | o | x | x | 5.0 |
| | IF | 51 | 8 | 52.3 | 60 | 20 | 20 | — | — | 5.0 | o | 3B | 100/100 | o | o | o | 2.5 |
| Com-par-ative Ex. | IG | (Oleic acid 100%) | — | 52.3 | 60 | 20 | 20 | — | — | 5.0 | — | — | — | — | — | — | not hardened |
| | IH | 100 | — | 36.6 | 60 | 20 | 20 | — | — | 4.0 | o | 2B | 100/100 | o | o | x | 3.0 |

*HPA: 2-hydroxypropyl acrylate
BHPA: 3-butoxy-2-hydroxypropyl acrylate
TMP: Trimethylolpropane trimethacrylate
EEA: 2-ethoxyethyl acrylate
**Bake hardening, the oven temperature was 100° C

IIA PREPARATION OF OIL-MODIFIED ALKYD RESIN

Preparation Example - II-1

60.0 Parts of dehydrated castor oil fatty acid, 26.9 parts of phthalic anhydride, 14.8 parts of glycerin, and 5.4 parts of pentaerythritol were charged into a reaction vessel equipped with a stirrer, a thermometer, a cooler, a water separator, and a nitrogen inlet pipe. 4 parts of xylene was then added to the vessel. The resulting mixture was reacted together in a stream of nitrogen at a temperature of 220° C. until the acid value of the reaction mixture became less than 20. After this, the water and xylene were removed from the reaction product to obtain a yellowish brown alkyd resin modified with dehydrated castor oil fatty acid and having an oil length of 62.8% (resin-IIA).

Preparation Example - II-2

An alkyd resin modified with dehydrated castor oil fatty acid and having an oil length of 68.0% (resin-IIB) was prepared according to the procedure described in Example II-1 except that 65.0 parts of dehydrated castor oil fatty acid, 21.8 part of phthalic anhydride, 2.8 parts of glycerin, and 17.2 parts of pentaerythritol were used.

Preparation Example - II-3

An alkyd resin modified with linoleic acid and having an oil length of 68.0% (resin-IIC) was prepared according to the procedure described in Example II-1 except that 65.0 parts of linoleic acid was used instead of 60.0 parts of dehydrated castor oil fatty acid.

Preparation Example - II-4

An alkyd resin modiried with soybean oil fatty acid and having an oil length of 62.8% (resin-IID) was prepared according to the procedure described in Example II-1 except that 60.0 parts of soybean oil fatty acid was used instead of 60.0 parts of dehydrated castor oil fatty acid.

Preparation Example - II-5

An alkyd resin modified with dehydrated castor oil fatty acid and having an oil length of 52.3% (resin-IIE) was prepared by the procedure described in Example II-1 except that 50.0 parts of dehydrated castor oil fatty acid, 34.8 parts of phthalic anhydride, 21.4 parts of glycerin, and 21.4 parts of neopentyl glycol were used.

Preparation Example - II-6

An alkyd resin modified with linoleic acid and having an oil length of 73.2% (resin - IIF) was prepared by the procedure described in Example II-1 except that 70.0 parts of linoleic acid, 17.8 parts of phthalic anhydride, and 19.0 parts of pentaerythritol were respctively used instead of 60.0 parts of dehydrated castor oil fatty acid, 26.9 parts of phthalic anhydride, and 5.4 parts of pentaerythritol.

IIB PREPARATION OF OIL-MODIFIED ALKYD RESIN COMPOSITION

Each of the oil-modified alkyd resins IIA through IIF was blended with an ethylenically unsaturated polymerizable monomer in the ratio indicated in Table II to prepare an oil-modified alkyd resin composition.

IIC PAINT EVALUATION

Each of the above-mentioned oil-modified alkyd resins IIA through IIF was blended with a polymerizable monomer in the ratio indicated in Table II. Then, 0.5 part of cobalt naphthenate (a metal content of 6%), 0.5 part of manganese naphthenate (a metal content of 4%), and 1.0 part of cyclohexanone peroxide were added to 100 parts of each of the resultant mixtures (paint compositions). The resulting paints were respectively applied on a polished mild steel plate measuring 50mm × 150mm and having a thickness of 0.3mm. The quantity of paint applied was such that the thickness of the paint film became 40 μ. The painted steel plate was left to stand in an air bath at a temperature of 30° C. for 7 days. At the end of that period, the physical and chemical properties of the film formed on the steel plate were determined under the following conditions. The results are shown in Table II.

The phydical and chemical properties were determined by the following measurement methods.

Viscosity: Emila Rotary Viscometer (manufactured by Reciprotor A/S, Denmark) was used.
Pencil hardness: The measurement was carried out according to Japanese Industrial Standards, K-5652 method. Evaluation was made on the basis of the occurrence of a scratch.
Water proofness: Observation of change after immersion in water at a temperature of 20° C. for 24 hours. (⊙ = no change, o = a slight blister occurs, x = blister occurs on the entire surface)
Acid resistance: Observation of a change after immersion in a 5% aqueous solution of sulfuric acid at a temperature of 20° C for 5 hours. (o = no change, x = change)
Flexure resistance: According to Japanese Industrial Standards, K-5400 (2mm).
Finger touch drying time: According to Japanese Industrial Standards, K-5400.

Table 2

| Ex. | Oil-modified alkyd resin, Quantity of linoleic acid and linolenic acid contained in fatty acid (%) | Oil length (%) | Paint composition Oil-modified resin (%) | Polymerizable monomer (%) BDDA | TMP | HPA | THFA | Viscosity (poise 25°C) | surface smoothness | Pencil hardness | Water proofness After one day | 3 days | Acid resistance | Alkali resistance | Flexure resistance | Finger touch drying time (hour) |
|---|---|---|---|---|---|---|---|---|---|---|---|---|---|---|---|---|
| | Type | | | | | | | | | | | | | | | |
| | IIA | 80 | 62.8 | 55 | 20 | — | 25 | — | 4.5 | ○ | 2H | ◉ | ◉ | ○ | ○ | ○ | 1.5 |
| | IIA | 80 | 62.8 | 55 | 10 | 5 | 15 | 10 | 4.3 | ○ | 2H | ◉ | ◉ | ○ | ○ | ○ | 1.1 |
| | IIA | 80 | 62.8 | 55 | — | 5 | 40 | — | 5.2 | ○ | H | ◉ | ◉ | ○ | ○ | ○ | 2.0 |
| | IIA | 80 | 62.8 | 55 | 20 | 10 | 25 | — | 6.2 | ○ | 2H | ◉ | ◉ | ○ | ○ | ○ | 1.2 |
| | IIA | 80 | 62.8 | 50 | 30 | — | 20 | — | 2.2 | ○ | H | ◉ | ◉ | ○ | ○ | ○ | 2.0 |
| | IIB | 80 | 68.0 | 55 | 20 | — | 25 | — | 4.0 | ○ | 2H | ◉ | ◉ | ○ | ○ | ○ | 1.5 |
| | IIB | 80 | 68.0 | 60 | — | 15 | 25 | — | 6.5 | ○ | 2H | ◉ | ◉ | ○ | ○ | ○ | 1.5 |
| | IIC | 100 | 68.0 | 55 | 20 | — | 25 | — | 3.5 | ○ | 2H | ◉ | ◉ | ○ | ○ | ○ | 1.0 |
| | IIC | 100 | 68.0 | 80 | — | — | — | 20 | 15.0 | ○ | H | ◉ | ◉ | ○ | ○ | ○ | 1.5 |
| | IIC | 100 | 68.0 | 60 | 20 | — | 20 | — | 5.5 | ○ | F–H | ◯ | ○ | ○ | ○ | ○ | 2.0 |
| | IIE | 80 | 52.3 | 55 | 20 | — | 25 | — | 4.6 | ○ | F–H | ○ | × | × | × | ○ | 2.5 |
| Comparative Ex. | IID | 59 | 62.8 | 55 | 20 | — | 25 | — | 5.0 | ○ | 4B | × | × | × | ○ | ○ | 1.2 |
| | IIF | 100 | 73.2 | 45 | 30 | — | 25 | — | 3.3 | ○ | B | ◯ | ◯ | ○ | ○ | ○ | 1.5 |
| | IIA | 80 | 62.8 | 55 | — | 35 | 10 | — | 1.5 | ○ | H | × | × | ○ | ○ | ○ | 1.5 |
| | IIA | 80 | 62.8 | 55 | — | — | — | — | 6.2 | ○ | 2H | ○ | ○ | ○ | ○ | × | 2.0 |

BDDA: 1,4-butanediol diacrylate
TMP: Trimethylolpropane trimethacrylate
HPA: 2-hydroxypropyl acrylate
THFA: Tetrahydrofurfuryl acrylate

I claim:

1. An oil-modified alkyd resin composition substantially free of solvent comprising:
   (A) 50 to 80% by weight of an oil-modified alkyd resin which has been modified with a fatty acid containing at least 65% by weight of linoleic acid and/or linolenic acid and has an oil length of 40 to 70%; and
   (B) 50 to 20% by weight of an acrylate and/or methyacrylate which is a monester of an alcohol having from 2 to 20 carbon atoms and having at least two hydroxyl groups and acrylic acid or methacrylic acid, wherein the component B has a boiling point of at least 200° C.

2. A composition as claimed in claim 1, wherein the oil length is 40 to 60%.

3. A composition as claimed in claim 1, wherein the acrylate and/or methacrylate is selected from the group consisting of 2-hydroxypropyl acrylate, 3-butoxy-2-hydroxypropyl acrylate, 3-butoxy-2-hydroxypropyl methacrylate, 2-hydroxy-1-phenylethyl acrylate and 2-hydroxy-1-phenylethyl methacrylate.

4. A composition as claimed in claim 1, wherein the component (A) comprises 60 to 70% by weight of said composition.

5. A composition as claimed in claim 1, wherein the component (B) comprises 20 to 40% by weight of said composition.

6. A composition as claimed in claim 1, which further comprises an organic peroxide in an amount of 0.5 to 5 parts by weight per 100 parts by weight of the sum of components (A) and (B).

7. A composition as claimed in claim 1, in which said oil-modified alkyd resin is comprised of phthalic acid and 3-(β-methyl-2-butenyl)-5-methyl-1,2,3,6-tetrahydrophthalic anhydride.

8. An oil-modified alkyd resin composition substantially free of solvent comprising:
   (A) 50 to 80% by weight of an oil-modified alkyd resin which has been modified with a fatty acid containing at least 60% by weight of linoleic acid and/or linolenic acid and has an oil length of 40 to 70%;
   (B) 0 to 45% by weight of an acrylate and/or methacrylate which is a monoester of an alcohol having from 2 to 20 carbon atoms and having at least 2 hydroxyl groups and acrylic acid or methacrylic acid; and
   (C) 0 to 30% by weight of an acrylate and/or methyacrylate which is a di-, tri- or tetra-ester of an alcohol having from 2 to 20 carbon atoms and at least two hydroxyl groups and acrylic acid or methacrylic acid, the sum of the components (B) and (C) being in the range of 50 to 20% by weight, wherein both components (B) and
   (C) have a boiling point of at least 200° C.

9. A composition as claimed in claim 8, wherein the monoester of the component (B) is selected from the group consisting of 2-hydroxypropyl acrylate, 3-butoxy-2-hydroxypropyl acrylate, 3-butoxy-2-hydroxypropyl methacrylate, 2-hydroxy-1-phenylethyl acrylate and 2-hydroxy-1-phenylethyl methacrylate.

10. A composition as claimed in claim 8, wherein the component (C) is selected from the group consisting of 1,4-butanediol diacrylate, 1,4-butanediol dimethacrylate, trimethylolpropane triacrylate and trimethylolpropane trimethacrylate.

11. A composition as claimed in claim 8, wherein the component (C) comprises 5 to 25% by weight of said composition.

12. A composition as claimed in claim 8, wherein the sum of the components (B) and (C) comprises 40 to 30% by weight of said composition.

13. A composition as claimed in claim 8, in which said oil-modified alkyd resin is comprised of phthalic acid and 3-(β-methyl-2-butenyl)-5-methyl-1,2,3,6-tetrahydrophthalic anhydride.

14. A composition as claimed in claim 8, wherein the component (A) comprises 60 to 70% by weight of said composition.

15. A composition as claimed in claim 8, wherein the component (B) comprises 20 to 40% by weight of said composition.

* * * * *